United States Patent [19]

Fujita et al.

[11] 4,220,519

[45] Sep. 2, 1980

[54] METHOD OF SUPPRESSING THE RISE IN SURFACE TEMPERATURE OF HEATING TUBES BY AMMONIA INJECTION

[75] Inventors: Kohei Fujita, Ginowan; Youichi Owan; Minoru Ozawa, both of Naha, all of Japan

[73] Assignee: Nippon Petroleum Refining Company, Limited, Tokyo, Japan

[21] Appl. No.: 959,015

[22] Filed: Nov. 9, 1978

[30] Foreign Application Priority Data

Nov. 15, 1977 [JP] Japan .............................. 52-136253

[51] Int. Cl.² ........................ C10G 9/16; C23F 14/02
[52] U.S. Cl. ................................... 208/48 AA; 203/6; 203/50; 208/255; 208/348; 208/363; 585/950
[58] Field of Search ................. 208/48 AA, 347, 356, 208/362, 255, 348; 203/6, 7, 8, 9, 50, 59; 585/861, 950

[56] References Cited

U.S. PATENT DOCUMENTS

| | | | |
|---|---|---|---|
| 2,644,785 | 7/1953 | Harding et al. | 208/79 |
| 3,876,531 | 4/1975 | Brunn | 208/210 |
| 4,107,030 | 8/1978 | Slovinski et al. | 208/48 AA |

*Primary Examiner*—Delbert E. Gantz
*Assistant Examiner*—G. E. Schmitkons
*Attorney, Agent, or Firm*—Scully, Scott, Murphy & Presser

[57] ABSTRACT

According to this invention, there is provided a method of suppressing the rise in surface temperature of the heating tubes in a fractionation apparatus for a crude oil, characterized in that an aqueous solution containing ammonia or ammonium ion is injected into the upstream line of the crude heater in an amount of 1 to 20 ppm in terms of ammonia based on the crude oil.

4 Claims, 4 Drawing Figures

METHOD OF SUPPRESSING THE RISE IN SURFACE TEMPERATURE OF HEATING TUBES BY AMMONIA INJECTION

BACKGROUND OF THE INVENTION

1. Field of the Invention

This invention relates to a method of suppressing an abnormal rise in surface temperature of the heating tubes in a fractionation apparatus for a crude oil, characterized in that a suitable amount of ammonia based on the crude oil is injected into the upstream side of the crude heater.

2. Description of the Prior Art

In the petroleum refining industry, various petroleum products are manufactured usually by fractionating crude oils in a fractionation apparatus. This fractionation apparatus is composed of a crude heater called "pipe still" and a fractionater. Within the crude heater there are heating tubes through which a fluid to be heated passes, and crude oils absorb heat necessary for fractionation. On heating above a certain temperature, crude oils will decompose, resulting in the deterioration of quality and the change in product distribution, on the other hand the inner surface of the heating tubes in the crude heater will be fouled thereby causing a drop in heat transfer efficiency. Once the heating tubes are fouled, it inevitably becomes necessary to raise the temperature of the heating tubes to maintain the supply temperature of crude oil to the fractionater at a predetermined value. If such fouling becomes more gross, the surface temperature of the heating tubes will rise to an abnormal extent and this causes problems in point of safety. Consequently, the interior of the heating tubes must be cleaned frequently by various methods, which is very disadvantageous from the economic point of view.

SUMMARY OF THE INVENTION

This invention provides a new method which prevents the heating tubes from being fouled and minimizes the frequency of cleaning of tubes. With respect to the fouling within the heating tubes, its details are not clear, but the tendency of fouling depends on the type of a crude oil to be treated. For example, it has been found that under normal fractionation conditions the treatment of Arabian and Sumatra crude oils causes little fouling, while the treatment of Kalimantan crude oils such as Seria, Bekapai, Handil, and Attaka crude oils, causes a gross fouling.

Having made a study of various methods of suppressing the fouling in consideration of the above situations, we found that ammonia or ammonia compound had a very outstanding suppressing effect against such a fouling, and thus the present invention was accomplished.

More particularly, the present invention relates to a method of suppressing the rise in surface temperature of the heating tubes in a fractionation apparatus for a crude oil by adding ammonia or ammonia compound to the crude oil at the upstream side of the crude heater in an amount of 1 to 20 ppm based on the crude oil.

BRIEF DESCRIPTION OF THE DRAWINGS

In FIG. 1:

1 Steel separator, 2 Sample vessel, 3A and 3B Chambers within the sample vessel, 4 Pump, 5 Flow meter, 6 Heating part, 7 Heating part outlet, 8 and 13 Electric heaters, 9 Thermocouple, 10 Withdrawing valve, 11 Pressure gauge, 12 Nitrogen conduit In FIG. 2, the reference numerals 1 through 9 constitute a graph with respect to various crude oil samples, more particularly:

1 Bekapai crude oil blank, 2 Bekapai crude oil+ammonia 3 ppm, 3 Bekapai crude oil+ammonia 10 ppm, 4 Sumatra Light Crude oil blank, 5 Arabian Light crude oil blank, 6 Sumatra Light crude oil+ammonia 3 ppm, 7 Arabian Light crude oil+ammonia 10 ppm, 8 Bekapai crude oil+commercially available antifoulant 10 ppm, 9 Bekapai crude oil+commercially available antifoulant 30 ppm

In FIG. 4, the reference numerals 10 through 12 constitute a graph with respect to various crude oils, more particularly:

10 Kalimantan crude oil, 11 Kalimantan crude oil+commercially available antifoulant 30 ppm, 12 Kalimantan crude oil+ammonia 3 ppm.

DESCRIPTION OF THE INVENTION

Ammonia or ammonia compound used in the present invention may be fed in gaseous or liquid state, but preferably it is convenient to inject as an aqueous solution containing ammonium ion. In this case, it must be injected into the upstream side of the crude heater, but the injection can be done advantageously for example by injecting it into the crude oil feed line from an injection line or by injecting it into the suction line of the crude oil charging pump. The amount of an aqueous solution containing ammonia or ammonium ion to be added depends on the kind of crude oil, but suitably ranges from 1 to 20 ppm and preferably from 2 to 10 ppm in terms of ammonia based on crude oil. With too small quantity of such aqueous solution, the fouling suppressing ability is not sufficient, while with too large quantity, there is formed a corrosive substance which is presumed to result from reaction with a sulfur compound contained in crude oil in the top of the crude fractionater, which not only causes the problem of corrosion of the apparatus, but also causes the concentration of ammonium ion contained in the condensed water to become too high resulting in an increased load in waste water treatment, and thus inconveniences occur from the standpoint of both environment conservation and economical operation.

DESCRIPTION OF PREFERRED EMBODIMENTS

The following examples are given to further illustrate the present invention, but the invention is not limited to these examples.

EXAMPLE 1

Figure 1:
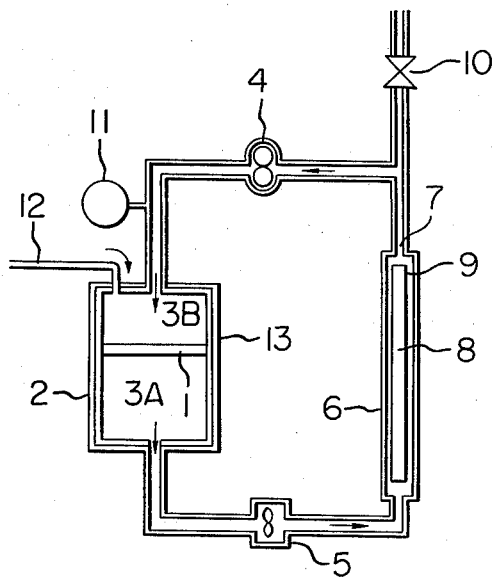
FIG. 1 is a schematic view of a fouling tester which is used for evaluation of the effect of the present invention.

Using the fouling tester shown in FIG. 1, the degree of fouling was evaluated.

Evaluation Method

A sample oil was placed in the chamber 3A of the sample vessel 2 equipped with a vertically movable steel separator 1 and was heated to about 60° C. The pump 4 was started and it was confirmed with reference to the flow meter 5 that there was a predetermined flow rate, and the sample was returned to the chamber 3B of the sample vessel 2 via the heating part 6.

While the sample oil was heated by the electric heater 8 so that its temperature at the heating part outlet 7 was 300° C., the surface temperature of the heating tube was measured by the thermocouple 9 and the fouling of the heating part was evaluated from the rising curve of such temperature.

Sample Oils

Bekapai crude oil (Kalimantan crude oil)
Arabian Light crude oil
Sumatra Light crude oil

Conditions of the Tester

Intrasystem pressure: 5 Kg/cm$^2$.G
Fluid flowing velocity: 5 mm/sec
Sample oil temp. at heating part outlet: 300° C.
Amount of ammonia added: Ammonia water was added to the samples so as to reach a predetermined value.

Figure 2:
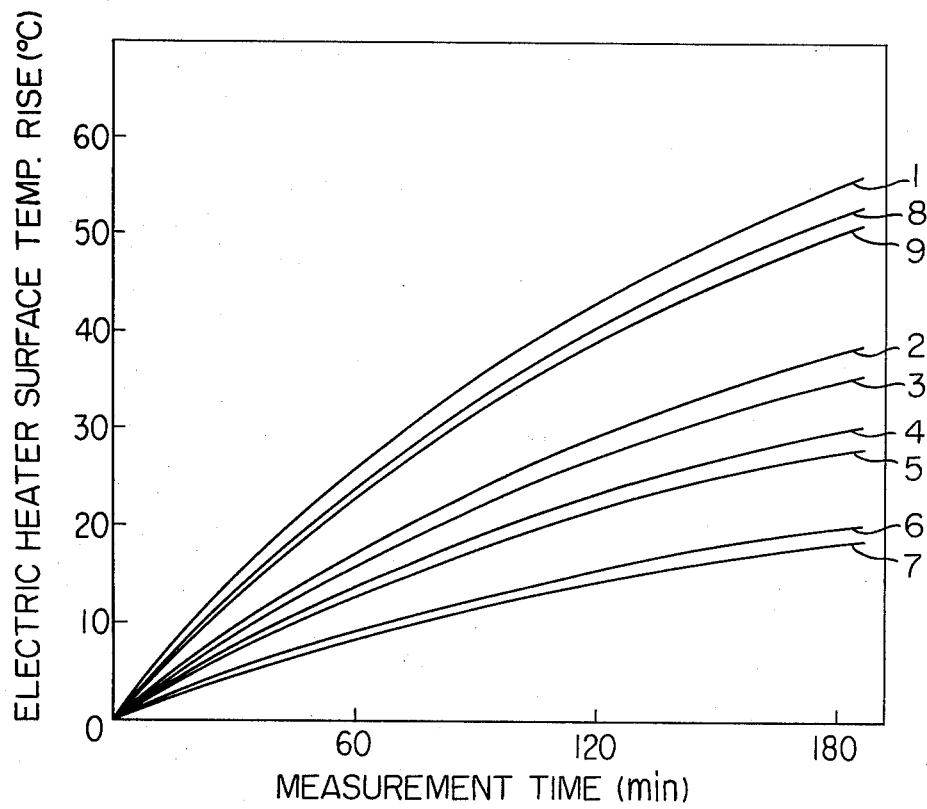
FIG. 2 is a graph showing the fouling tendency of various crude oils and the ammonia injection effect by the present invention.
Figure 3:
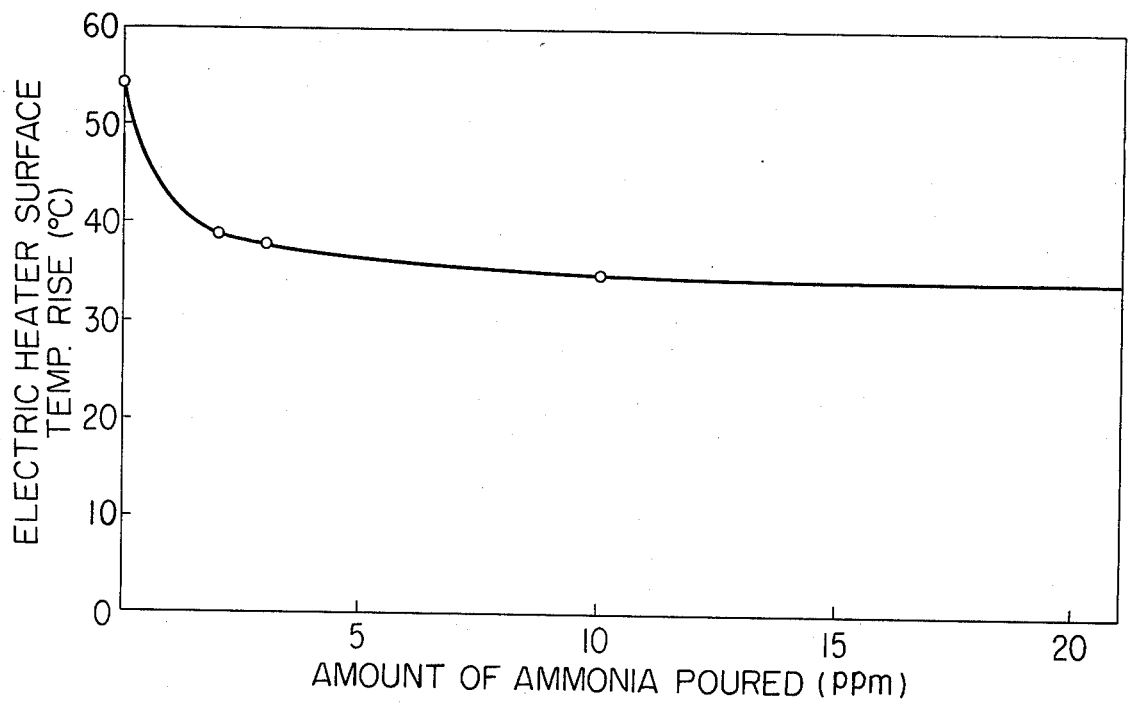
FIG. 3 is a graph showing the ammonia injection effect by the present invention on Bekapai crude oil.

The results of measurement of the heating tube surface temperature in the heating part were shown in Table 1 and FIGS. 2 and 3.

From the above results it became clear that the temperature rising tendency caused by fouling differed according to the kind of crude oil, but that in all cases fouling could be suppressed to a large extent by the addition of ammonia.

EXAMPLE 2

Bekapai crude oil was treated in an atmospheric fractionation apparatus for crude oils, resulting in that the interior of the heating tubes in the crude heater were fouled and the temperature of the tube surface rose rapidly. Thereafter, the heating tubes were cleaned by the conventional steam air decoking method, and a commercially available antifoulant and ammonia water were added to the crude oil in predetermined amounts at the suction line of a crude oil charge pump and then the surface temperature of the heating tubes was measured.

Figure 4:
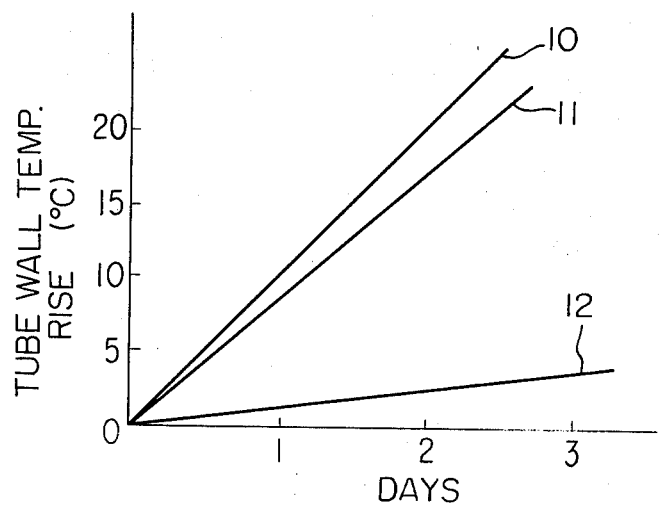
FIG. 4 is a graph showing the rise in temperature of the tube surface in the actual crude heater.

The operating conditions of the actual apparatus were as follows:

Oil temp. at heating furnace inlet: 170° C.
Oil temp. at heating furnace outlet: 280° C.
Pressure temp. at heating furnace inlet: 7.5 Kg/cm$^2$.G
Pressure temp. at heating furnace outlet: 1.2 Kg/cm$^2$.G
Fluid flowing velocity within heating tubes: 1.10 m/sec The results are shown in Table 2 and FIG. 4, from which it became clear that by the addition of ammonia there was no longer an abnormal rise in surface temperature of the heating tubes and that consequently the interior of the heating tubes was little fouled.

Furthermore, also in the treatment of a crude oil mixture of Bekapai crude oil and other crude oil, e.g. Sumatra Light crude oil, the ammonia addition was effective to about the sample extent.

Table 1

| Sample | Electric heater surface temp. rise* (°C.) | | | | |
|---|---|---|---|---|---|
| | Amount of ammonia added (ppm) | | | Amount of Commercial antifoulant added (ppm) | |
| | 0 | 3 | 10 | 10 | 30 |
| Bekapai crude oil | 55 | 38 | 35 | 52 | 50 |
| Arabian Light crude oil | 28 | 20 | 18 | — | — |
| Sumatra Light crude oil | 30 | 20 | 17 | — | — |

*Temperature rise in 180 minutes after sample charge

Table 2

| Crude Oil | Heating tube surface temp. rise* (°C.) | | | |
|---|---|---|---|---|
| | Amount of ammonia added (ppm) | | | Amount of Commercial antifoulant added (ppm) |
| | 0 | 3 | 10 | 30 |
| Bekapai crude oil | 20 | 3 | 2 | 17 |

*Measured in 2 days after oil charge

We claim:

1. A method of suppressing the rise in surface temperature of heating tubes in a fractionation apparatus for a crude oil which comprises: injecting an aqueous solution of ammonia into the crude oil at the upstream side of the crude heater in an amount of 1 to 20 ppm in terms of ammonia based on the crude oil.

2. A method according to claim 1, in which the aqueous solution is injected in an amount of 2 to 10 ppm in terms of ammonia based on the crude oil.

3. A method according to claim 1, in which the aqueous solution is injected into the crude oil feed line from an injection line.

4. A method according to claim 1, in which the aqueous solution is injected into the suction line of a crude oil charging pump.

* * * * *